Oct. 27, 1953  J. N. BRCKOVICH  2,657,042
AUXILIARY SPRING DEVICE FOR MOTOR VEHICLES
Filed Sept. 28, 1950
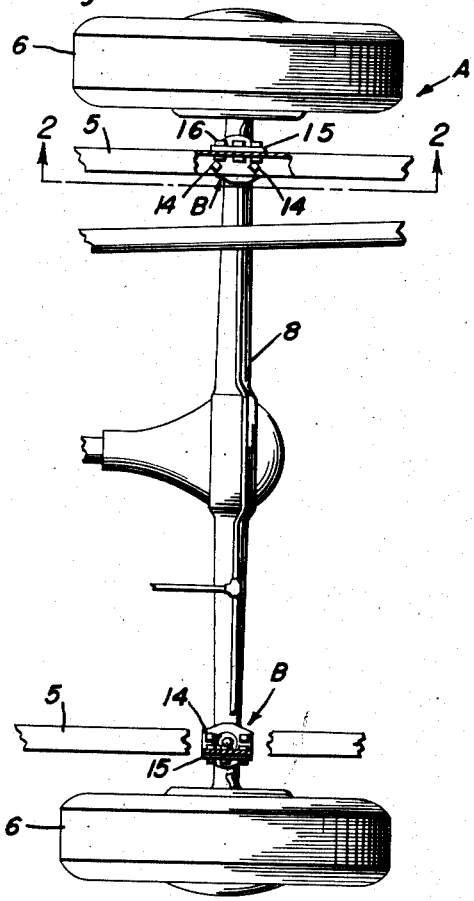
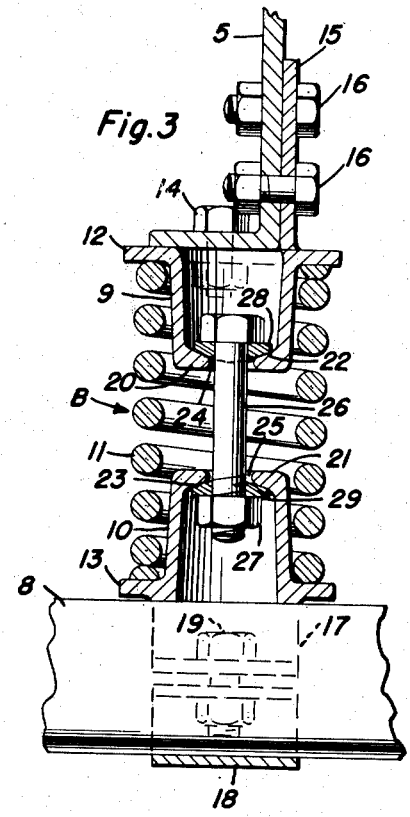
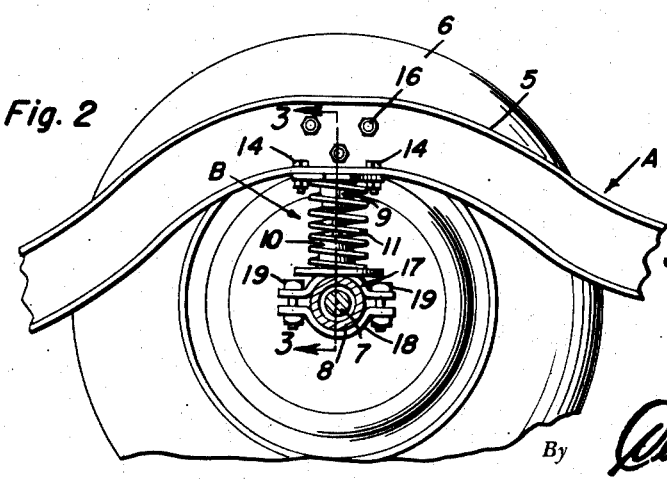
Joseph N. Brckovich
Inventor
By Clarence A. O'Brien
and Harvey B. Jacobson
Attorneys Patented Oct. 27, 1953

2,657,042

UNITED STATES PATENT OFFICE 2,657,042

AUXILIARY SPRING DEVICE FOR MOTOR VEHICLES

Joseph N. Brckovich, Gary, Ind.

Application September 28, 1950, Serial No. 187,296

1 Claim. (Cl. 267—28)

This invention relates to an auxiliary spring device for motor vehicles, and more particularly to a spring device installed between each side frame member and the rear axle and differential housing of the vehicle for supplementing the ordinary leaf springs of the latter and preventing damage due to breakage of either leaf spring, overloading, and the like.

An object of the invention is to provide a simple and efficient spring device of the above kind which will provide a positive connection between the frame member and the housing and will permit desirable free limited horizontal movement of the frame relative to the housing.

Another object is to provide a spring device of the above kind which may be readily installed by simply drilling several holes in the side frame member of the vehicle.

In the accompanying drawing:

Figure 1 is a fragmentary top plan view, with the leaf springs omitted and parts broken away and in section, of the rear portion of a motor vehicle chassis having spring devices embodying the present invention installed between the side frame members and the rear axle and differential housing.

Figure 2 is an enlarged section taken on the line 2—2 of Figure 1.

Figure 3 is an enlarged section taken on the line 3—3 of Figure 2.

Referring in detail to the drawing, A indicates a conventional motor vehicle chassis, and B indicates auxiliary spring devices embodying the present invention.

The vehicle chassis includes channel side frame members 5, rear traction wheels 6 carried by driven rear axles one of which is shown at 7 in Figure 2, and a housing 8 for the rear axles and a differential gearing between a longitudinal drive shaft and the inner ends of said axles. The usual leaf springs, not shown, are provided between the chassis frame and the housing 8 as shown, for example, at 13 in the U. S. patent to G. O. Stratton, No. 1,937,854, December 5, 1933.

A spring device B is installed between each side frame member 5 and the housing 8, and as both spring devices are the same, description of one will suffice for both. Each device B includes an upper cup member 9 fixed to the under side of the bottom flange of the associated frame member 5, an inverted cup member 10 fixed upon the adjacent portion of housing 8 in spaced relation to and in vertical alignment with the cup member 9, and a helical compression spring 11 having the cup members 9 and 10 received in the ends thereof. The cup members 9 and 10 have external base flanges 12 and 13 at their open ends against which the ends of spring 11 bear. The flat base flange 12 of cup member 9 is bolted at 14 to the under side of the lower flange of frame member 5, and a second flat vertical flange 15 is rigidly connected to and extends upwardly from said flange 12 and is bolted at 16 to the web portion of frame member 5. The flange 13 of cup member 10 has the saddle plate 17 of a split clamp forming the under side thereof, and this saddle plate is seated on the housing 8. The clamp also includes a cap plate 18 fitted against the under side of housing 8 and bolted at 19 to saddle plate 17 to secure the cup member 10 to said housing. At their adjacent ends, the cup members 9 and 10 have end walls 20 and 21 provided with concave inner surfaces 22 and 23 and central openings 24 and 25. The cup members are connected so that they can freely move toward each other when the spring 11 is compressed, so that separation of said cup members is limited, and so that the cup member 9 can have limited horizontal motion in any direction relative to the cup member 10. For this purpose the stem of a bolt 26 passes loosely through the openings 24 and 25, a nut 27 is screwed onto said bolt, and washers 28 and 29 having convex faces which engage the faces 22 and 23 are fitted on the stem of bolt 26 inwardly of the head of the bolt 26 and the nut 27. Since the cups are capable of some horizontal movement and the bolt is loosely fitted therein, the bolt will not bind with the cups. The washers are of a smaller diameter than the internal diameter of the cup members at the walls 20 and 21 so that said washers may have universal movement and thereby permit the bolt to assume different limited angular positions relative to the vertical axes of the cup members. The action of the spring 11 against the bolt 26 riding on the convex washers 28 and 29 tends to bring the cups into alignment.

Should a leaf spring at one side of the vehicle break the load at the same side of the vehicle will be taken by the spring of the device B at that side. In case of an overload, the springs of the devices B will assist the leaf springs of the vehicle in sustaining the load. The normal compression of spring 11 can be adjusted by adjusting the nut 27. Bolt 26 prevents undue separation or relative horizontal movement of the cup members.

When a vehicle equipped with the described assembly, is operated around a curve, there is a tendency for the vehicle body to lean outward, but the spring of the outside assembly or device will compress while that of the inside assembly expands. The inside assembly working with the inside leaf spring creates an overturning movement. However, the bolt 26 limits the upward thrust of both the leaf spring and the coil spring 11. This action checks the overturning movement due to the two inside springs.

What is claimed as new is:

In a vehicle provided with side frame members sustained above a rear axle and differential housing by leaf springs, an auxiliary spring device between each of said side frame members and said housing, each spring device comprising a cup member fixed to the under side of one side frame member and provided with a bottom wall having a concave inner surface and a central opening, an inverted cup member fixed upon said housing in vertical alignment with the first-named cup member and having a top wall provided with a concave inner surface and a central opening, said cup members including base flanges, a helical compression spring bearing at its ends against said base flanges and having said cup members received in the ends thereof and spaced apart thereby for independent movement laterally, a bolt having its stem loosely extending through said openings of the cup members, a nut screwed on said bolt, and washers fitted on said bolt inwardly of the head of the latter and said nut and having convex faces engaging the concave surfaces of said cup members to provide universal joints between said bolt and said cup members.

JOSEPH N. BRCKOVICH.

References Cited in the file of this patent

UNITED STATES PATENTS

| Number | Name | Date |
|---|---|---|
| 1,022,225 | Chabot | Apr. 2, 1912 |
| 1,062,872 | Abbot | May 27, 1913 |
| 1,287,034 | Johnson | Dec. 10, 1918 |
| 1,706,462 | O'Connor | Mar. 26, 1929 |